US007263952B1

(12) United States Patent
Tsengas

(10) Patent No.: US 7,263,952 B1
(45) Date of Patent: Sep. 4, 2007

(54) APPARATUS AND METHOD OF MAKING A PET CHEW TOY

(75) Inventor: Steven Tsengas, Fairport Harbor, OH (US)

(73) Assignee: Our Pet's Company, Fairport Harbor, OH (US)

( * ) Notice: Subject to any disclaimer, the term of this patent is extended or adjusted under 35 U.S.C. 154(b) by 190 days.

(21) Appl. No.: 11/009,164

(22) Filed: Dec. 10, 2004

Related U.S. Application Data

(60) Provisional application No. 60/528,818, filed on Dec. 12, 2003.

(51) Int. Cl.
*A01K 29/00* (2006.01)
(52) U.S. Cl. ...................................... 119/709; 119/711
(58) Field of Classification Search ................ 119/707, 119/709–711
See application file for complete search history.

(56) References Cited

U.S. PATENT DOCUMENTS

| D332,982 S | * | 2/1993 | Norman et al. ............ D21/713 |
| 5,370,390 A | * | 12/1994 | Swanson ..................... 473/410 |
| 6,634,970 B2 | * | 10/2003 | Jiminez ...................... 473/597 |
| 2003/0079693 A1 | * | 5/2003 | Jager .......................... 119/707 |

* cited by examiner

*Primary Examiner*—K. Smith
(74) *Attorney, Agent, or Firm*—John D. Gugliotta, Pe, Esq.

(57) ABSTRACT

A chew toy comprises a generally spherical body having a plurality of circumferential channels for receiving and housing a plurality of rings therein. The plurality of channels are formed in an exterior circumferential surface of the body. The plurality of channels are formed parallel, perpendicular or diagonally to a central axis of the body. Each of the plurality of rings is defined by a toroidal form, each of the plurality of rings snap-fit into a corresponding one of the plurality of channels. Each one of the plurality of rings comprises a tasteful flavor appealing and attractive to a canine. Each one of the plurality of rings comprises a pleasant and appealing scent attractive to a canine.

2 Claims, 1 Drawing Sheet

APPARATUS AND METHOD OF MAKING A PET CHEW TOY

RELATED APPLICATIONS

This application claims the benefit of U.S. Provisional Application No. 60/528,818, filed on Dec. 12, 2003.

BACKGROUND OF THE INVENTION

1. Field of the Invention

The present invention is generally directed to a canine chew toy, and more particularly, is directed to an apparatus and method of making a canine chew toy comprising a generally spherical body having a plurality of circumferential channels for receiving and housing a plurality of rings therein.

2. Description of the Related Art

There are numerous chew toys available in a variety of forms and sizes. To the applicant's knowledge, there are no canine chew toys available that provide the following advantages and overcome the problems, deficiencies and disadvantages associated with commonly available canine chew toys.

The present invention provides a canine chew toy comprising a generally spherical body having a plurality of circumferential channels for receiving and housing a plurality of rings therein. The channels and rings provide contrasting textures for a canine to chew, thereby stimulating muscle growth and strength in the jaw and neck muscles, and contributing to the overall dental health by aiding in removal of excess plaque and strengthening the teeth through exercise. Finally, the toy may be impregnated with a liquid (juice) substance pleasing and attractive to a canine. The canine chew toy may also be impregnated with a pleasing scent that is generally attractive to canines.

Consequently, there exists a continuous need for new ideas and enhancements for existing products in the pet chew toy industry.

SUMMARY OF THE INVENTION

In one exemplary embodiment, a chew toy is disclosed as having a generally spherical body having a plurality of circumferential channels for receiving and housing a plurality of rings therein. The plurality of channels are formed in an exterior circumferential surface of the body. The plurality of channels are formed parallel, perpendicular or diagonally to a central axis of the body. Each of the plurality of rings is defined by a toroidal form, each of the plurality of rings snap-fit into a corresponding one of the plurality of channels. Each one of the plurality of rings comprises a tasteful flavor appealing and attractive to a canine. Each one of the plurality of rings comprises a pleasant and appealing scent attractive to a canine.

BRIEF DESCRIPTION OF THE DRAWINGS

The advantages and features the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
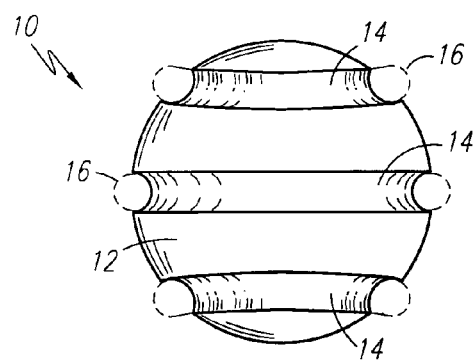
FIG. 1 is a perspective view of a canine chew toy, wherein the toy comprises a spherical body with a plurality of channels for receiving and housing a plurality of rings.
Figure 2:
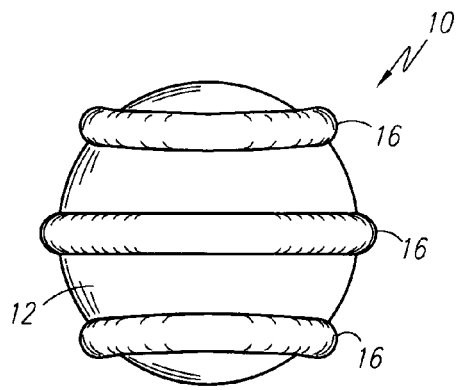
FIG. 2 is a perspective view of the canine chew toy with the rings secured to the channels formed in the spherical body.
Figure 3:
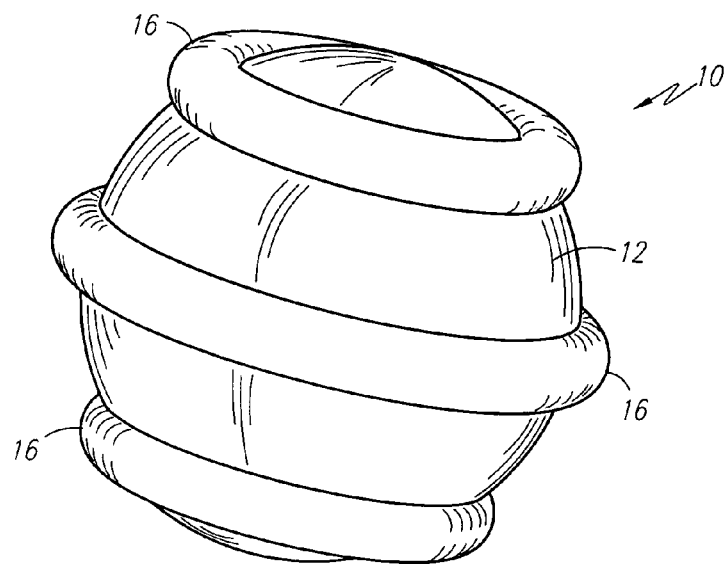
FIG. 3 is a perspective view of the canine chew toy.

The best mode for carrying out the invention is presented in terms of its preferred embodiment, herein depicted within FIGS. 1 through 3.

1. Detailed Description of the Figures

Referring now to FIG. 1 through FIG. 3, a canine chew toy (hereinafter "toy") 10 is shown in accordance with a preferred embodiment of the present invention. The toy 10 comprises a generally spherical body 12 having a plurality of circumferential channels 14 for receiving and housing a plurality of rings 16 therein.

The body 12 comprises a plurality of channels 14 formed in the exterior circumferential surface thereof. The channels 14 may be formed parallel, perpendicular or diagonally to a central axis "C" of the body 12. In FIG. 1 and FIG. 2, the channels 14 are depicted as perpendicular to (or horizontal to) the central axis "C". It is envisioned that at least one channel 14 is formed substantially at the equator of the body 12. It is further envisioned that at least one channel 14 is formed superior to the channel at the equator and at least one channel 14 is formed inferior to the channel at the equator, opposite the superior channel. Further multiple channels 14 may be provided, depending upon the size of the toy 10, the size of the channels 14 and corresponding rings 16.

The rings 16 are toroidal in form and snap-fitting (interference/frictional fit) into the respective channels 14 corresponding to the respective circumference. The rings 16 are envisioned to be provided with scents and/or flavors appealing and attractive to canines, or other animals that might play with such a toy 10 (such as cats, mice, gerbils, or other pets).

Fabrication of the toy 10 is envisioned as comprising a one or two step molding process, dependent upon the desirability to use plastic and rubber materials in combination to form a harder interior and a softer exterior of the toy 10. The choice of either plastic or rubber will allow for a single step molding process. Conversely, use of a combination of plastic and rubber likely will require a two step molding process. Furthermore, the dual substance (plastic and rubber) fabrication of the toy 10 provides contrasting textures for a canine to chew, thereby stimulating muscle growth and strength in the jaw and neck muscles, and contributing to the overall dental health by aiding in removal of excess plaque and strengthening the teeth through exercise. It is intended that the material used to fabricate the toy 10 is deformable and returnable resilient.

During the fabrication processes, it is further envisioned that the toy 10 may be impregnated with a liquid (juice) substance (not shown in figures) for enhancing the enjoyment of the toy 10 and for freshening the breath of the canine. The toy 10 may also include scents impregnated in the material, further enhancing the attractiveness and appeal of the toy 10 to a canine.

It is further envisioned that the rings 16 may be provided and sold separately from the combination body 12 and rings 16 described above. For instance, if the original rings 16 are exhausted of scent and/or taste, or deformed beyond use, a separately available series of rings 16 is desirable to replace the original rings 16.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention is used by a pet to stimulate chewing activity. Through chewing, the pet can exercise jaw muscles, remove plaque from teeth, strengthen the teeth, and promote better dental hygiene. The pet will chew on the toy, having ridges and rings to attract the pet visually or by smell. The ridges and rings offer resistence to the pet, thereby encouraging muscle development while also removing any debris from the teeth. The pet toy may be thrown and retrieved, and may be manufactured in such a way as to be buoyant in water for retrieval therefrom by the pet.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A chew toy comprising:
    a generally spherical body having a plurality of circumferential channels; and
    a plurality of rings received and housed within said plurality of circumferential channels
    wherein each one of said plurality of rings comprises a tasteful flavor appealing and attractive to a canine.

2. A chew toy comprising:
    a generally spherical body having a plurality of circumferential channels; and
    a plurality of rings received and housed within said plurality of circumferential channels
    wherein each one of said plurality of rings comprises a pleasant and appealing scent attractive to a canine.

* * * * *